INVENTOR.
David Bryant
BY
Att'y and Sept. 24, 1957

2,807,333
DEVICE FOR PREVENTING RUNAWAY VEHICLES

David Bryant, Sharp Park, Calif., assignor to James Cummins, San Francisco, Calif.

Application September 27, 1955, Serial No. 537,005

1 Claim. (Cl. 188—4)

This invention relates to a device for preventing runaway vehicles.

The principal object of this invention is to provide means for the dropping of a self-aligning chock beneath the revolving wheels of a truck or trailer so as to reduce acceleration and to bring the wheels to a complete stop.

A further object is to provide means whereby the driver of the vehicle may at all times maintain absolute control of the truck in proceeding over a highway or down a grade, with assured ability to stop the truck whenever desired by means positioned within the cab of the vehicle.

A further object is to produce a device of this character which may be attached to any ordinary motor vehicle with a minimum amount of expense.

A further object is to produce a device which is sturdy in construction, one which may be used over and over again, and one which takes up a minimum amount of room.

A still further object is to produce a device which may be manually used for parking purposes, as on a grade.

Other objects and advantages will be apparent during the course of the following description.

In the accompanying drawings forming a part of this specification and in which like numbers are employed to designate like parts throughout the same, Fig. 1 is a tractor and trailer having my invention applied thereto;

Figure 1:
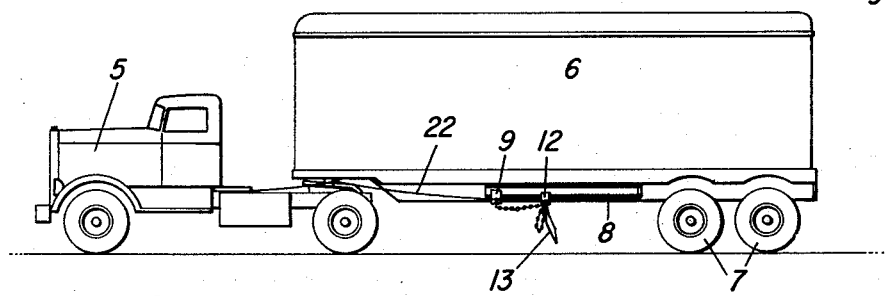

Many very serious accidents have occurred due to the fact that a tractor and trailer become unmanageable through brake failure, loss of vacuum, dead motor, skidding or when moving over slippery surfaces. Applicant has therefore devised a chock which may be used either as a parking safety feature or may be dropped while the vehicle is under way for an emergency stop if the stop cannot be made in the ordinary manner.

In the accompanying drawings, wherein for the purpose of illustration is shown a preferred embodiment of my invention, the numeral 5 designates a tractor as a whole and the numeral 6 the trailer, which has rear wheels 7.

My invention consists of positioning beneath the trailer 6 a bar 8. This bar 8 may, if desired, be a portion of the trailer frame and upon the bar I provide two sliders consisting of two blocks 9 and 9' held together by a bolt 11, which bolt serves to tighten the blocks about the bottom of the beam and against the web thereof.

A block is shown at 12 and is of similar construction to the blocks 9 and 9' and serves to support the chock as will be later described.

My chock consists of a triangular frame 13 having cross chains 14. The apex of the chock is secured by a chain 16 to a U-bolt 17 carried by the friction blocks 9 and 9' nearest the front of the vehicle. Secured to the cross piece 18 of the chock is a meshed trailer 19 which may be made of pieces of wire cable, the purpose of which will be later seen.

Figure 2:
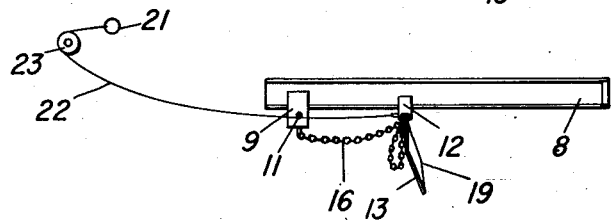
Fig. 2 is a fragmentary diagrammatic view showing the rail and chock hanging therefrom.
Figure 3:
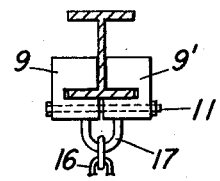
Fig. 3 is an enlarged fragmentary cross sectional view of the rail and friction block.
Figure 4:
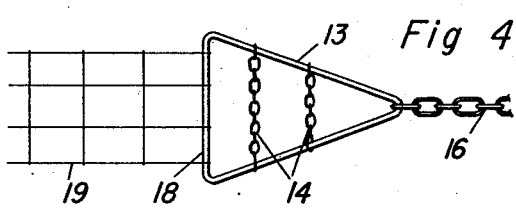
Fig. 4 is a top plan view of the chock and meshed trailer.
Figure 5:
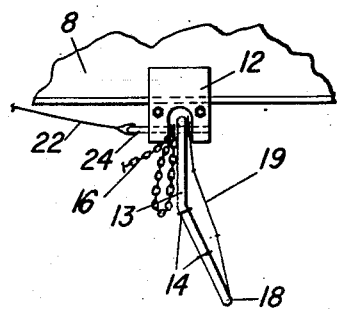
Fig. 5 is an enlarged fragmentary detailed view showing the manner in which the chock and the meshed trailer are suspended beneath the bar.

Referring now to Figs. 2 and 5, it will be noted that I have provided in the cab a pull loop 21 which is attached to a cable 22 passing over a pulley 23 and having its opposite end attached to a pull pin 24 slidable in the bottom of the block 12.

This block has a slot formed in its lower portion so that the apex of the chock may straddle the pull pin 24, and therefore be hung beneath the trailer as shown in Fig. 1.

The mesh trailer 19 is also doubled back so as to be retained by this pin 24 (see Fig. 5).

The result of this construction is that when the vehicle is under way and the user wishes to stop the vehicle, he pulls on the loop 21 which serves to pull the cable 22 and pin 24, dropping the chock on to the highway.

Figure 6:
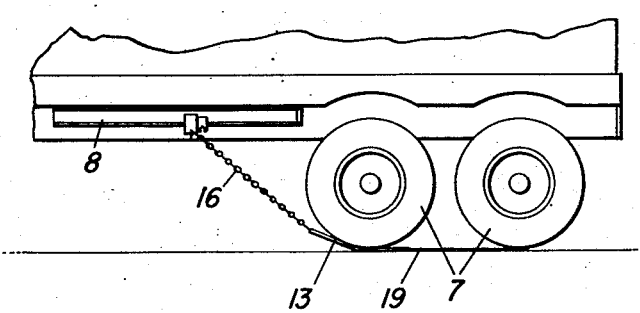
Fig. 6 is a fragmentary diagrammatic view showing the manner in which the chock and meshed trailer come to rest beneath the rear wheels of the vehicle.

The advancing wheel of the trailer will roll on to the mesh, which will tend to stop the rotation of the wheel. Due to the inertia of the vehicle, a sudden stopping of the wheel would tear the parts asunder and therefore the drag is transmitted through the chain 16 to the blocks 9 and 9' which now begin to slide rearwardly along the bar 8 until they contact the block 12, and from then on both blocks move rearwardly until they arrive at the position shown in Fig. 6, at which time the rotation of the wheels will have ceased. From then on, the effect of the cross chains 14 will be such that the sliding of the vehicle as a whole will be brought to a complete stop in a manner similar to the use of tire chains on an icy road. It is of course understood that there is a chock located on both sides of the vehicle and that the same are dropped simultaneously.

When the driver is parked upon a hill and wishes to be sure the vehicle does not break away, he merely pulls the pin 24 and allows the chock to drop on to the ground, then rolls forward a short distance until the chock begins to perform its function. As soon as the parts arrive at the position shown in Fig. 6, the vehicle is securely locked against any possibility of further forward movement.

It is of course understood that the chain 16 is of sufficient length to permit the mesh to reach a point under the wheel, while the blocks 9 and 9' are in their advanced position. It is therefore necessary to form a loop in the chain by having the pull pin 24 pass through one of the links as best illustrated in Figs. 1 and 5.

When it is desired to re-assemble the parts in non-operating position, the vehicle is backed up until the wheels are off of the chock and the mesh, and then the blocks are loosened and returned to their normal position, after which the chain and chock are hung up as best shown in Fig. 1.

It will thus be seen that my invention accomplishes all of the objects above set forth. It is to be understood that the form of my invention herewith shown and described is to be taken as a preferred example of the same and that various changes relative to the material, size, shape and arrangement of the parts may be resorted to without departing from the spirit of the invention or the scope of the subjoined claim.

Having thus described my invention, I claim:

In a device of the character described, a wheeled vehicle having a body, an I bar secured beneath said body, a pair of friction blocks slidably and adjustably frictionally secured to the lower flanges of said I bar, a triangularly shaped chock releasably supported from said block and secured to said block by a chain, a trailing mesh secured to said chock, and remote means for releasing said chock whereby when the wheel of said vehicle engages said mesh and said chock, said blocks will be moved on said bar to form a friction brake.

References Cited in the file of this patent

UNITED STATES PATENTS

| | | |
|---|---|---|
| 944,603 | Eigenmann | Dec. 28, 1909 |
| 1,148,047 | Ray | July 27, 1915 |
| 1,201,684 | Brockhaus | Oct. 17, 1916 |
| 1,392,987 | Unruh | Oct. 11, 1921 |
| 1,582,911 | Eichorn | May 4, 1926 |

FOREIGN PATENTS

| | | |
|---|---|---|
| 165,688 | Switzerland | Feb. 16, 1934 |